United States Patent [19]

Kivistö et al.

[11] Patent Number: 4,925,598
[45] Date of Patent: May 15, 1990

[54] AERATOR FOR INDUSTRIAL AND DOMESTIC WASTEWATERS

[75] Inventors: Tuomo V. J. Kivistö, Espoo; Tauno T. Koho, Helsinki; Arvo E. Andersson, Espoo, all of Finland

[73] Assignee: Outokumpu Oy, Helsinki, Finland

[21] Appl. No.: 204,721

[22] Filed: Jun. 10, 1988

[30] Foreign Application Priority Data

Jun. 11, 1987 [FI] Finland .................. 872615

[51] Int. Cl.$^5$ .............................. B01F 3/04
[52] U.S. Cl. .................................. 261/87
[58] Field of Search ........................ 261/87

[56] References Cited

U.S. PATENT DOCUMENTS

| | | | |
|---|---|---|---|
| 2,415,585 | 2/1947 | Genova | 261/87 |
| 2,892,543 | 6/1959 | Daman | 261/87 |
| 3,920,779 | 11/1975 | Abele | 261/87 |
| 4,283,357 | 8/1981 | Sidery | 261/87 |
| 4,720,361 | 1/1988 | Andersson | 261/87 |
| 4,800,017 | 1/1989 | Krishnaswamy et al. | 261/87 |

FOREIGN PATENT DOCUMENTS

| | | | |
|---|---|---|---|
| 234697 | 3/1910 | Fed. Rep. of Germany | 261/87 |
| 7108614 | 12/1972 | Netherlands | 261/87 |

*Primary Examiner*—Tim Miles
*Attorney, Agent, or Firm*—Dellett, Smith-Hill and Bedell

[57] ABSTRACT

The invention relates to the aerating of domestic and industrial wastewaters by means of an aerator placed on the bottom of the oxidation pond. Particularly the invention relates to the structure of the stator of the aerator. The stator comprises the stator shell structure (4), the stator ducts (7) directed outwards with respect to the outer edge of the shell structure, legs (5) attached to the shell and extending to the bottom of the pond, as well as triangular blade members (6) fastened to the said legs.

13 Claims, 5 Drawing Sheets

AERATOR FOR INDUSTRIAL AND DOMESTIC WASTEWATERS

The present invention relates to the aerating of domestic and industrial wastewaters by means of an aerator to be placed on the bottom of the oxidation pond. Particularly the invention relates to the structure of the stator of the aerator.

Sewage aerators are generally divided into surface and bottom aerators. In the prior art there is known for example a bottom aerator, where the necessary equipment, i.e. hydraulics, ejectors and blower is combined to form a uniform entity. The air absorbed by the apparatus is evenly distributed in the ring casing and pumped in small bubbles, mixed in the water, into the pond via the ejectors. The number of ejectors is 10–24.

The FI patent application 862145 discloses an aerator comprising a rotor and a surrounding stator which is provided with a closed ring and is formed of flow channels which are rectangular in cross-section. The adjacent vertical bounding surfaces of immediately adjacent flow channels are shifted further away from each other towards the outer circumference of the stator, and the vertical bounding surfaces of each flow channel are parallel, with a deviation of 7° at the most. The flow channels are formed for instance by means of U-profiles installed on circular plates.

The drawings of the above mentioned application reveal that the rotor and the surrounding stator are of the same height. The space left in between the rotor and the stator is very small, in practice only a few millimeters. It is clear that the air discharged from the rotor cannot mix well into the surrounding slurry in such a limited space. As was stated above and is likewise apparent from the drawings, the flow channels are formed on top of a ring plate or in between two such plates. Particularly the ring plate placed below prevents free mixing of the slurry with the air jet discharged from the rotor.

The FI patent application 842029 introduces a bottom aerator formed of a stator and a conical rotor provided with rotor blades and air inlets placed in the rotor housing behind the rotor blades. The apparatus functions effectively up to a certain amount of air, but when attempts are made for feeding very large gas amounts, the rotor starts to rotate in an "air bubble", and as is well known, this is extremely harmful for the rotor because it may cause torsional damage to the rotor shaft, and in cany case it leads to a decrease in the efficiency.

A generally accepted advantage of the two above described devices has been that by employing them, very small gas bubbles can be created. However, practice has shown that in aerating this is not always an advantage, because normally these small bubbles tend to combine and form large bubbles, which rise up to the surrounding atmosphere instead of aerating the liquid to be aerated.

In order to eliminate the drawbacks of the above described devices, we have now developed an aerator apparatus, wherein a rotor—of the same type as in the FI application 842029—is surrounded by a stator which comprises a stator shell structure, legs attached to the shell structure and extending to the bottom of the pond, as well as triangular blade members fastened to the legs. The flow ducts can be either radially or tangentially directed with respect to the rotor.

The invention is further explained with reference to the appended drawings, where FIG. 1 is an oblique axonometric illustration of the aerator of the invention;

Figure 1:
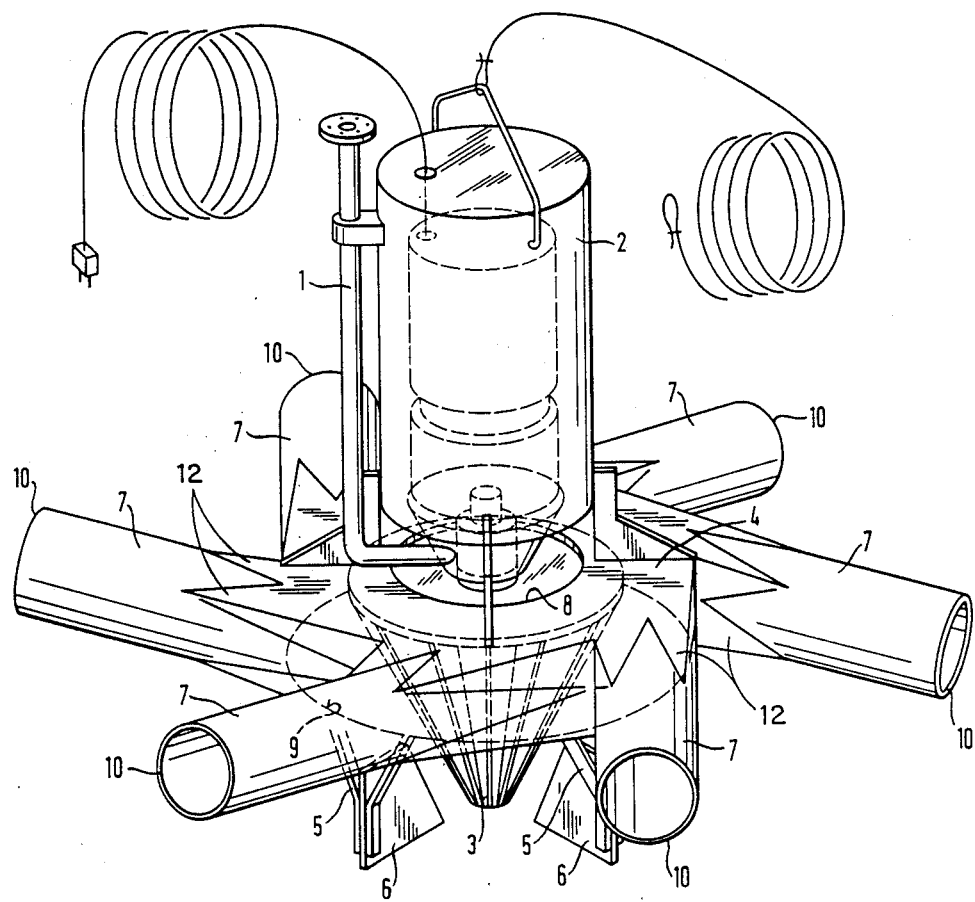

FIG. 1 shows that the gas is supplied into the aerator via the supply pipe 1 to the bottom part of the operating unit 2. Therefrom the gas proceeds through a hollow rotor shaft 13 (FIG. 5) to within the conical rotor 3, and is discharged into liquid via the opening 14 provided behind the rotor blades. The structure of the rotor will be described in further detail below The stator comprises the shell structure 4 installed around the top part of the rotor, the support legs 5 directed downwards therefrom, the triangular blade members 6 attached to the said legs, and the stator ducts 7 starting from the outer edge of the shell structure. The stator ducts 7, which are supported relative to the shell structure 4 by triangle gusset plates 12, can be installed either radially or tangentially with respect to the rotor, but best results have been achieved with tangentially installed ducts.

The gas, such as air, discharged from the openings of the rotor 3, is mixed into the surrounding slurry in the space left between the rotor 3 and the stator shell 4. The top opening 8 of the shell structure 4 is located above the top part of the rotor, and the diameter of the top opening 8 is 0.6–0.9 times the diameter of the top part of the rotor, advantageously the diameter of the top part of the rotor multiplied by roughly 0.7. The cross-gap between the rotor and the shell structure in the top part of the shell is 5–20%, advantageously about 10% of the rotor height. The diameter of the bottom opening 9 of the shell structure is 1–2 times the diameter of the rotor, advantageously 1.1–1.5 times the rotor diameter. (For the sake of clarity, the rotor diameter always means the diameter of the top part of the rotor.)

By means of the stator ducts, the aerated liquid can always be conducted away from the immediate vicinity of the rotor, so that the effect of the aerating extends to a wider area. Another advantage is, as was already pointed out, that through the ducts the air can be lead out of the rotor space and thus the rotor can be prevented from rotating in an "air bubble".

The height of the stator shell structure and the diameter of the stator ducts can somewhat be adjusted according to the needs, but advantageously it remains within a range of 0.20–0.50 times the rotor height. If the diameter of the ducts is too small, only part of the aerated slurry flows through the ducts, but the rest flows outside and thus "kills" the duct flow.

Figure 2:
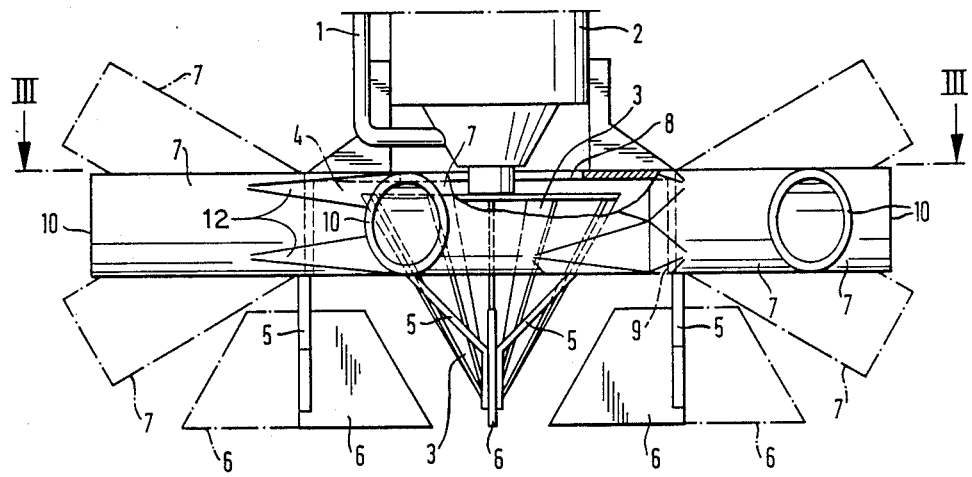
FIG. 2 is a vertical cross-section of the stator-rotor system, when the stator ducts are installed tangentially.
Figure 3:
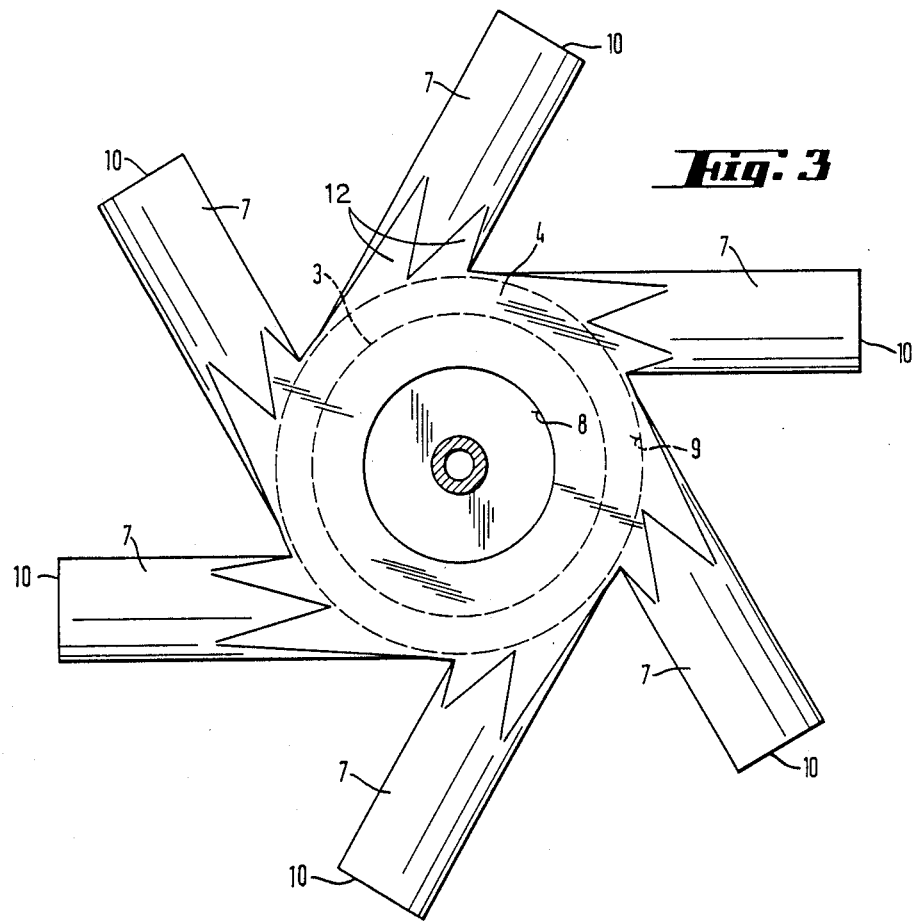
FIG. 3 is a top-view illustration of the rotor-stator system of FIG. 2.
Figure 4:
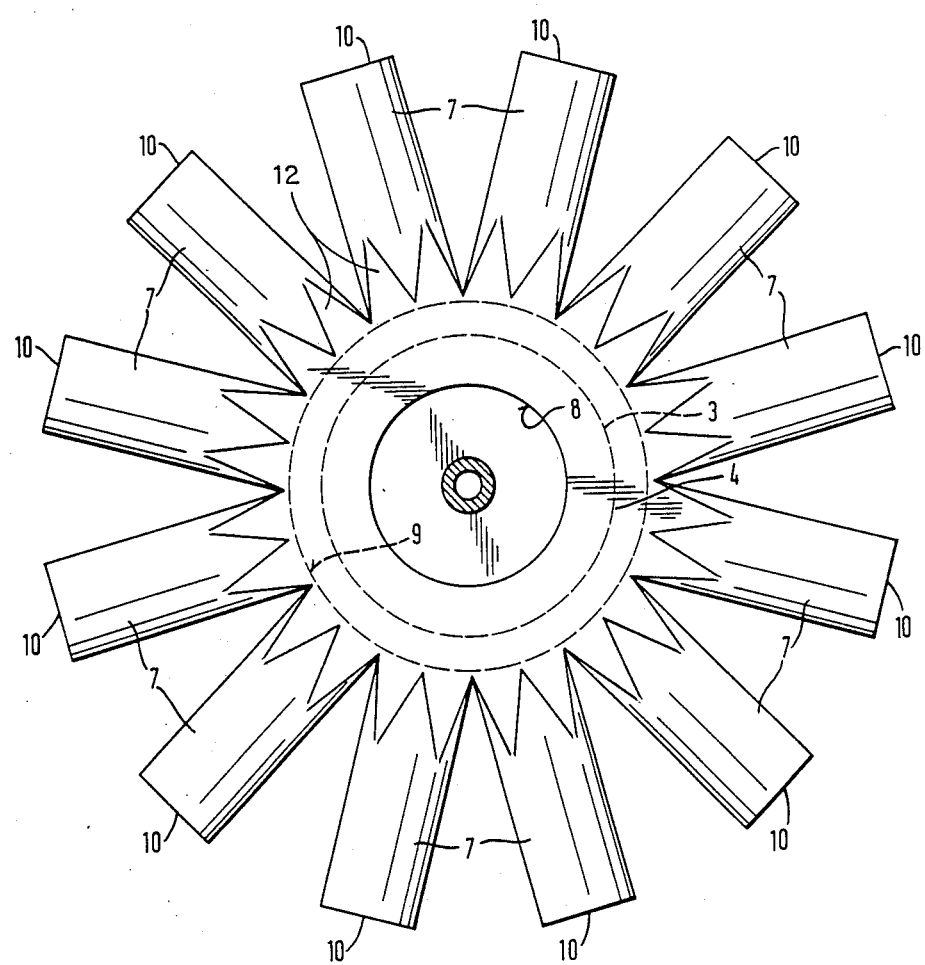
FIG. 4 is a top-view illustration of the rotor-stator system, when the stator ducts are installed radially.

According to the drawings, the stator shell and the stator ducts are placed in a horizontal position, but this is by no means necessary, because—as is indicated by the dotted lines in FIG. 2—the shell and the ducts can be installed with an inclination of 0°–30° upwards or downwards with respect to the horizontal level.

The number of the stator ducts may vary, for instance between 3 and 15, but it is pointed out that if the number of ducts grows too high, the flowing speed inside the ducts remains low, wherefore the most profitable amount in practice has proved to be 4–12.

The length of the stator ducts may also vary somewhat so that the diameter of the circle formed by the outer ends 10 of the ducts 7 is 2–5 times the rotor diameter. If the ducts are too long, the bubbles formed in the aerating process are combined inside the ducts and cause the hazard mentioned above. Back-eddies may also be formed in ducts which are too long, and a large amount of air contained in the ducts may cause a lifting effect in the whole aerator apparatus.

In FIGS. 1 and 2 the stator ducts 7 are described to be round. Without departing from the spirit of the invention, ducts of some other shape, such as rectangular ducts, can also be employed.

As is seen in FIG. 2, the blade members 6 attached to the stator legs 5 are advantageously triangular and narrowed towards the top. According to FIG. 2, the blade members 6 are installed so that they are advantageously directed inwards with respect to the legs 5, but the dotted lines marked in the same drawing indicate that the blade members 6 can also be installed to point outwards with respect to the stator legs 5.

The number of the legs may also vary, but is suitably 3–6. If the blade members of the stator legs are omitted, the slurry easily tends to twirl in the pond, and the use of the energy of the apparatus is very unstable. The stator legs are fastened to the shell structure 4.

Figure 5:
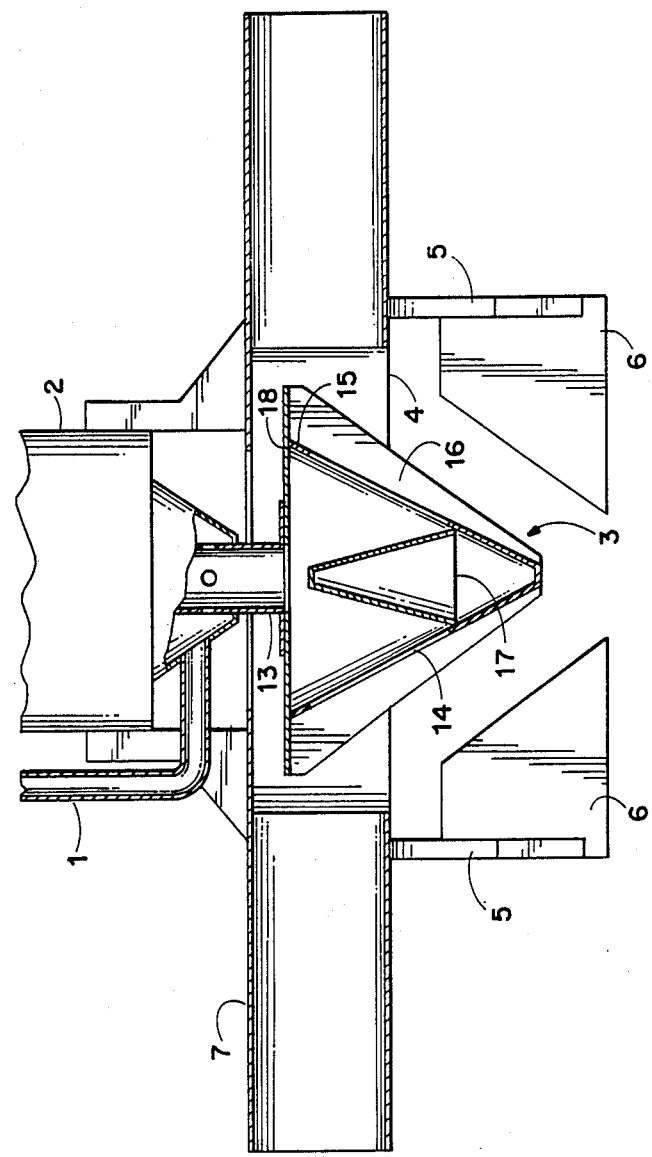
FIG. 5 is a side elevation of the rotor-stator system of FIG. 2.
Figure 6:
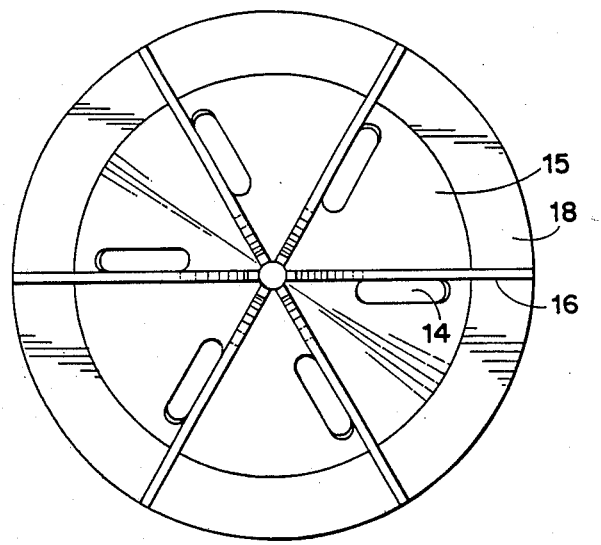
FIG. 6 is a bottom plan view of the rotor.
Figure 7:
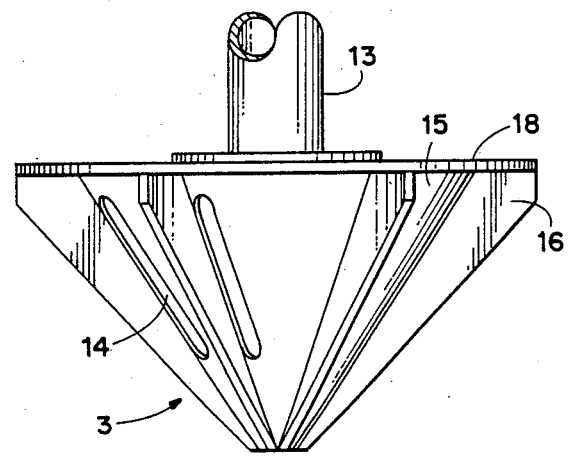
FIG. 7 is a vertical sectional view of the rotor.

The structure of the rotor is illustrated in detail in FIGS. 5, 6 and 7. The conical rotor 3 is connected to the hollow drive shaft 13, and comprises a rotor housing 15 in the form of a downward narrowing cone having rotor blades 16 projecting radially therefrom. The blades 16 are generally trapezoidal, being broader at the top of the rotor and narrowing smoothly in the downward direction. The openings 14 are formed in the rotor housing 15. The vertical extent of the openings 14 is not as great as the that of the rotor housing 15, but the openings 14 preferably extend over about two thirds of the height of the housing so that the bottom of each opening is somewhat above the point of the rotor housing.

Inside the rotor housing 15 is a second cone 17, which narrows in the upward direction. The bottom of the inner cone 17 is secured to the interior of the rotor housing 15 about one third of the way up the housing 15 from its bottom. A cover plate 18 extends over the upper part of the rotor housing 15. The height of the inner cone 17 is such that the top of the inner cone is below the cover plate 18. FIGS. 6 and 7 show that the cover plate 18 extends radially at least as far as the blades 16.

In operation, the aerator is placed in a pond of a slurry to be aerated, air is supplied to the hollow rotor shaft 13 through the supply pipe 1, and the rotor is driven to rotate by a motor included in the operating unit 2. As the rotor rotates and agitates the slurry, air is expelled through the openings 14, which are placed behind the rotor blades 16 in the direction of rotation of the rotor. The air leaving the rotor through the openings 14 aerates the slurry, and the aerated slurry leaves the shell structure 4 through the stator ducts 7 and slurry is drawn upwardly into the rotor. The inner cone 17, located inside the rotor housing 15, ensures that slurry does not remain inside the rotor housing but is expelled by centrifugal force. The inner cone 17 also controls supply of air to the opening 14.

By employing the apparatus of the present invention for the aerating of sewage, it has been possible to double the amount of air to be fed into the slurry, in comparision with an apparatus operated without stator ducts, and yet the rotor has not rotated in an air bubble.

As for the efficiency of the apparatus of the invention is practical conditions, the following results were obtained when comparing the apparatus for example with the apparatus of the FI patent application 842029:

Practical field of operation, wh/m$^3$ of wastewater

|  | domestic wastewater | industrial wastewater |
| --- | --- | --- |
| prior art | 100–200 | 200–400 |
| invention | 50–70 | 100–200 |

Efficiency in the use of oxygen by %

|  |  |
| --- | --- |
| prior art | 15–25 |
| present invention | 20–40 |

Aerating efficiency in standard conditions into pure water, kg $O_2$/kWh

|  |  |
| --- | --- |
| prior art | 1.8–2.0 |
| present invention | 2.0–2.5 |

The increase in capacity, when comparing the maximum capacities of apparatuses of the same size, has been 60%. It is pointed out that when employing the apparatus of the present invention, a large amount of oxygen can be fed into the slurry to be aerated.

We claim:

1. An apparatuss for feeding some oxidous gas, such as air, into a slurry containing solid materials, which apparatus is formed of a stator and a rotor (3) suspended at the end of an axis, the rotor (3) having the shape of a downwards narrowing cone, characterized in that the stator placed coaxially around the rotor comprises a stator shell (4) directed outwards the top part of the rotor, stator ducts (7) directed outwards from the outer circumference of the stator shell, stator legs (5) directed downwards from the stator shell (4) and triangular blade members (6) fastened to the said legs (5).

2. The apparatus of claim 1, characterized in that the diameter of the top opening (8) of the stator shell is 0.6–0.9 times the diameter of the rotor.

3. The apparatus of claim 1, characterized in that the diameter of the bottom opening (9) of the stator shell is 1–2 times the diameter of the rotor.

4. The apparatus of claim 1, characterized in that the height of the stator shell (4) and the diameter of the stator ducts (7) is 0.20–0.50 times the height of the rotor.

5. The apparatus of claim 1, characterized in that the number of the stator ducts (7) is 3–15.

6. The apparatus of claim 5, characterized in that that the number of the stator ducts (7) is 4–12.

7. The apparatus of claim 1, characterized in that the diameter of the circle formed by the outer ends (10) of the stator ducts (7) is 2–5 times the diameter of the rotor.

8. The apparatus of claim 1, characterized in that the stator ducts (7) are directed tangentially with respect to the rotor (3).

9. The apparatus of claim 1, characterized in that the stator ducts (7) are directed radially with respect to the rotor (3).

10. The apparatus of claim 1, characterized in that the stator shell (4) and the stator ducts (7) are essentially horizontal.

11. The apparatus of claim 1, characterized in that the stator shell (4) and the stator ducts (7) are placed at an angle of 0°-30° downwards with respect to the horizontal level.

12. The apparatus of claim 1, characterized in that the stator shell (4) and the stator ducts (7) are placed at an angle of 0°-30° upwards with respect to the horizontal level.

13. The apparatus of claim 1, characterized in that the triangular blade members (6) attached to the stator legs (5) are narrowed towards the top.

* * * * *